W. S. SILLCOCKS.
COMPOSITE CELLULOID SHEET.
APPLICATION FILED APR. 9, 1917.

1,257,541.

Patented Feb. 26, 1918.

Inventor
WARREN S. SILLCOCKS
By his Attorney

UNITED STATES PATENT OFFICE.

WARREN S. SILLCOCKS, OF NEW YORK, N. Y., ASSIGNOR TO THE SILLCOCKS-MILLER COMPANY, OF SOUTH ORANGE, NEW JERSEY, A CORPORATION OF NEW JERSEY.

COMPOSITE CELLULOID SHEET.

1,257,541.      Specification of Letters Patent.      Patented Feb. 26, 1918.

Application filed April 9, 1917. Serial No. 160,644.

*To all whom it may concern:*

Be it known that I, WARREN S. SILLCOCKS, a citizen of the United States, and a resident of New York city, in the county of New York and State of New York, have invented certain new and useful Improvements in Composite Celluloid Sheets, of which the following is a specification.

The invention involves a new method of manufacturing sheets of celluloid and the like whereby the sheets become useful for the production therefrom of various articles, one of which, for illustration, is a cap or closure having a transparent central portion through which the contents of a receptacle closed by the cap may be inspected, the necessity for removing the cap for this purpose being, by my invention, obviated.

The sheet produced in accordance with my invention is new and the articles manufactured therefrom are novel and useful, in that whatever the article may be, it will possess a transparent panel, which will be in effect integral with the article and so positioned that while serving its special purposes, the article itself may have smooth, polished, unbroken inner and outer surfaces and be of uniform thickness throughout.

The celluloid sheet of my invention may be said to be, for convenience of description, a composite sheet composed of three layers or sheets, but said sheet is when finished a substantially integral one-layer sheet, since in the manufacture of the sheet the several layers thereof are united.

In carrying out my invention I take a body sheet of opaque or non-transparent celluloid of suitable size and thickness and cut a hole therein of the size, shape and location desired for the transparent panel, and with the same tool used for cutting the hole in the opaque body-sheet I cut a blank from a transparent sheet of celluloid of the same thickness as the body-sheet, said blank thus being of the exact size and shape of said hole, in which it is placed to serve as the transparent panel. I then apply on the opposite faces of the body sheet and said transparent blank closely fitting the hole therein, integral sheets of transparent celluloid, and the three sheets or layers, to-wit: The body-sheet having the transparent blank therein and the two transparent outside sheets are chemically united, under heat and pressure, to form one sheet of uniform thickness. The final sheet thus prepared has a smooth unbroken surface and from it the article for which it was intended may be at once manufactured. If it should be desired to produce a cap having a transparent panel for a receptacle, a disk may be cut from the aforesaid final sheet with the said transparent blank at its center, and then by suitable dies said disk may be converted into a cap with the transparent panel at the center of its top or crown portion. When the cap thus made is placed on a receptacle, the contents of the receptacle may be inspected through the transparent panel of the cap without the removal of the cap.

The invention may be further understood from the following description given with reference to the accompanying drawings, in which.

Figure 1:
Figure 1 is a vertical section showing the four parts of the composite or final sheet in proper relation to one another to be assembled, the middle or body sheet being ready to receive in the hole cut therein, the transparent blank for the panel and then on its opposite faces the upper and lower integral transparent sheets.

In the drawings, 10 designates the non-transparent or opaque body-sheet of celluloid and other pyroxylin material, 11 the hole therein, 12 the transparent blank of the same size and shape as said hole, and which blank is of celluloid or other pyroxylin material, and 13 the upper and lower transparent sheets of celluloid or other pyroxylin material. The manufactured cap is numbered 14, and this cap is of a character which may be used on various receptacles, such as those containing toilet goods, and on stone or opaque glass jars holding salve and other medical goods. The cap has a top and depending annular side flange, as usual.

Figure 2:
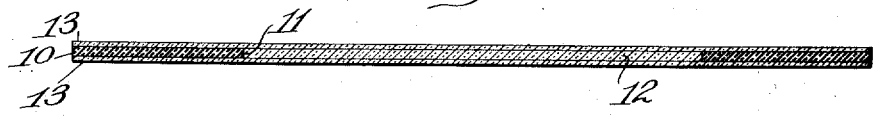
Fig. 2 is a vertical section through the completed composite sheet.

The thicknesses of the several layers forming the composite sheet shown in Fig. 2, will vary in accordance with the purposes for which the sheet is intended, but preferably the layer 10 will equal the combined thicknesses of the two layers 13. For caps for small jars (Fig. 4), I have used a body layer 10 of ten one-thousandths of an inch thick, and transparent layers 13 each of five one-thousandths of an inch thick. The blank 12 is of the same thickness as the body layer 10 and exactly fits the hole 11 in the same, and preferably the blank 12 is cut from a transparent sheet with the same tool that is employed to cut the hole 11 in the body-sheet 10.

The composite sheet shown in Fig. 2 is produced from the separate parts shown in Fig. 1, the blank 10 being inserted in the hole 11 of the sheet 10, and the sheets 13 then brought against opposite faces of the sheet 10 and blank 12, and the whole being united under heat and pressure, a celluloid cement having been spread on the upper side of the lower sheet 13 and the lower side of the upper sheet 13 so as to aid in effecting such union of the several sheets as to produce a composite sheet of integral character. The composite or final sheet is of smooth finish and uniform thickness, and from it by known methods may be made the cap 14 or other article in which a transparent panel would prove to be desirable.

Figure 3:
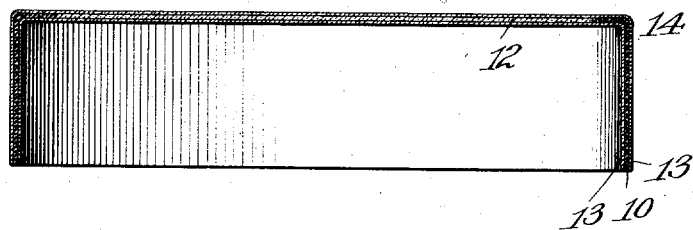
Fig. 3 is a vertical section, on a larger scale, through a cap or closure made from my composite sheet.
Figure 4:
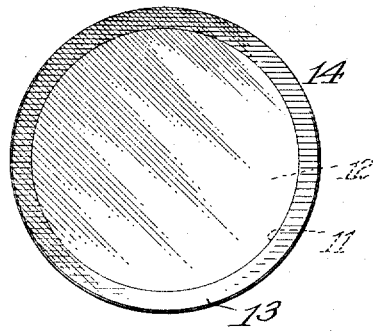
Fig. 4 is a top view, on a smaller scale, of the same.

The hole 11 in the body-sheet 10 and the transparent panel 12 are shown in Fig. 4 as circular, but obviously the outline of said hole and panel may vary according to the taste or desire of the manufacturer, and the same process of manufacture will be followed and the same result attained whether the outline of said hole and panel be of circular, square, star or other shape. The transparent panel 12, in the manufactured article, is bordered by a non-transparent portion of the composite sheet, as shown in Figs. 3 and 4, and this is an important feature of the structure, since it is desirable to conceal the edge portions of the receptacle, while permitting without the removal of the cap, the contents of the receptable to be inspected through the transparent panel.

The composite sheet produced in accordance with my invention may be utilized in the production of various useful articles, such as the caps 14, lids and fronts for boxes and other chambered receptacles, and kindred articles.

The composite sheet may be made of a size to suit its intended purpose, as indicated in the drawings.

From the foregoing description it will be seen that my invention involves the production of a novel celluloid composite sheet and various new and useful articles capable of being manufactured therefrom. I have mentioned "celluloid" as used in carrying out my invention, but would have it understood that the invention extends to and includes the use of the pyroxylin compounds and their equivalents variously commercially designated but of celluloid-like character.

What I claim as my invention and desire to secure by Letters-Patent, is:

1. As a new article of manufacture, a composite sheet comprising a non-transparent body-sheet having a hole cut therein, a transparent panel or blank within and fitting said hole, and transparent sheets on opposite sides of said body-sheet and panel, the whole being of pyroxylin material and united to produce an integral sheet.

2. As a new article of manufacture, a composite sheet comprising a non-transparent body-sheet having a hole cut therein, a transparent panel or blank within and fitting said hole, and transparent sheets on opposite sides of said body-sheet and panel, the whole being of pyroxylin material and united to produce an integral sheet, and said panel being of the same thickness as said body-sheet.

3. As a new article of manufacture, a composite sheet comprising a non-transparent body-sheet having a hole cut therein, a transparent panel or blank within and fitting said hole, and transparent sheets on opposite sides of said body-sheet and panel, the whole being of pyroxylin material and united to produce an integral sheet, and said body-sheet being of greater thickness than said transparent sheets.

4. As a new article of manufacture, a composite sheet comprising a non-transparent body-sheet having a hole cut therein, a transparent panel or blank within and fitting said hole, and transparent sheets on opposite sides of said body-sheet and panel, the whole being of pyroxylin material and united to produce an integral sheet, with said panel of the same thickness as said body-sheet and said body-sheet and panel of greater thickness than said transparent sheets.

Signed at New York city, in the county of New York and State of New York, this 6th day of April, A. D. 1917.

WARREN S. SILLCOCKS.

Witnesses:
ARTHUR MARION,
CHAS. C. GILL.